United States Patent
Unbehagen et al.

(10) Patent No.: US 7,486,659 B1
(45) Date of Patent: Feb. 3, 2009

(54) METHOD AND APPARATUS FOR EXCHANGING ROUTING INFORMATION BETWEEN VIRTUAL PRIVATE NETWORK SITES

(75) Inventors: Paul Unbehagen, Cary, NC (US);
Praveen Muley, Billerica, MA (US);
Paul Knight, Lexington, MA (US)

(73) Assignee: Nortel Networks Limited, St. Laurent, Quebec (CA)

( * ) Notice: Subject to any disclaimer, the term of this patent is extended or adjusted under 35 U.S.C. 154(b) by 962 days.

(21) Appl. No.: 10/616,621

(22) Filed: Jul. 10, 2003

Related U.S. Application Data

(60) Provisional application No. 60/449,641, filed on Feb. 24, 2003.

(51) Int. Cl.
*H04L 12/28* (2006.01)
*H04L 12/66* (2006.01)
*H04J 3/16* (2006.01)

(52) U.S. Cl. .............. 370/351; 370/352; 370/392; 370/395.31; 370/465

(58) Field of Classification Search .......... 370/390, 370/389, 352, 351, 400, 401, 254, 392, 395.31, 370/395.5, 466, 467, 395.3, 465
See application file for complete search history.

(56) References Cited

U.S. PATENT DOCUMENTS

| | | | | |
|---|---|---|---|---|
| 6,907,039 | B2 * | 6/2005 | Shen | 370/400 |
| 7,116,665 | B2 * | 10/2006 | Balay et al. | 370/392 |
| 7,136,374 | B1 * | 11/2006 | Kompella | 370/352 |
| 7,154,901 | B2 * | 12/2006 | Chava et al. | 370/401 |
| 7,274,704 | B1 * | 9/2007 | Ould-Brahim et al. | 370/409 |

OTHER PUBLICATIONS

Knight, et al., Network based IP VPN Architectures using Virtual Routers, Internet Engineering Task Force (IETF) Internet Draft (ID) draft-ietf-ppvpn-vpn-vr-03.txt, Jul. 2002.
Rosen, et al., BPG/MPLS VPNs, IETF Request For Comments (RFC) 2547, Mar. 1999.
Aggarwal, Architecture for Virtual Router Based 2547, IETF ID draft-raggarwa-ppvpn-vr-2547bis-00.txt, Nov. 2002.
Knight, et al., Virtual Router Redundancy Protocol, IETF RFC 2338, Apr. 1998.

* cited by examiner

*Primary Examiner*—Hanh Nguyen
(74) *Attorney, Agent, or Firm*—Anderson Gorecki & Manaras LLP

(57) ABSTRACT

A VR-VRF gateway enables VPN sites utilizing different VPN models, such as a virtual router based VPN and an IETF 2547 based VPN, to exchange routing information and communicate with each other over a VPN tunnel. Each VPN site on a VPN provides routing information to the VR-VRF gateway which stores the routing information in a routing table for that VPN. The routing information is distributed by the VR-VRF gateway to the other VPN sites. When the VR-VRF gateway receives a packet of data to be passed over the VPN tunnel, it accesses the routing table for the particular VPN to ascertain how the packet is to be routed, or the next hop attribute for the packet. Where the VR-VRF gateway is not configured to handle data traffic on the VPN tunnel, it populates routing entries on another network device on the VPN tunnel to enable the other network device to handle the actual traffic over the VPN tunnel.

23 Claims, 6 Drawing Sheets

Figure 4

| VR VPN ID | VR Routing Information | VRF VPN ID | BGP Next Hop & MPLS VPN label |
|---|---|---|---|
| VR VPN ID | VR Routing Information | VRF VPN ID | BGP Next Hop & MPLS VPN label |
| VR VPN ID | VR Routing Information | VRF VPN ID | BGP Next Hop & MPLS VPN label |
| VR VPN ID | VR Routing Information | VRF VPN ID | BGP Next Hop & MPLS VPN label |
| VR VPN ID | VR Routing Information | VRF VPN ID | BGP Next Hop & MPLS VPN label |
| ● ● ● | | | |
| VR VPN ID | VR Routing Information | VRF VPN ID | BGP Next Hop & MPLS VPN label |

Figure 5

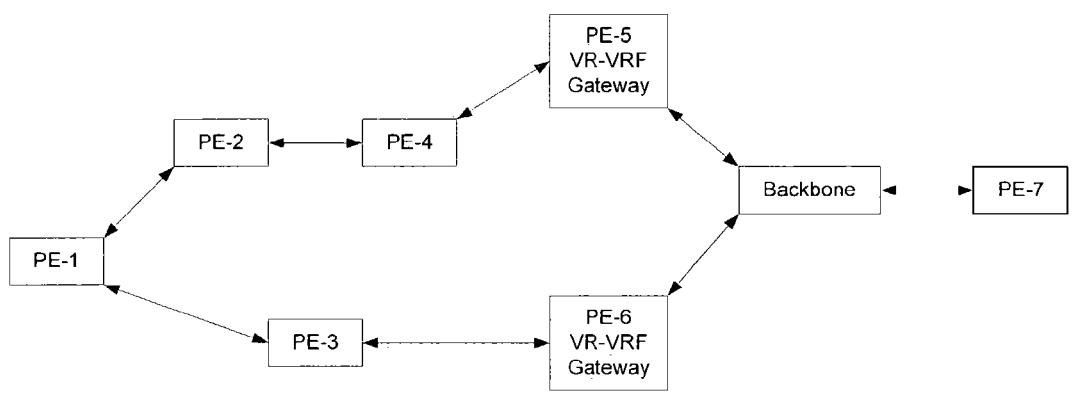

METHOD AND APPARATUS FOR EXCHANGING ROUTING INFORMATION BETWEEN VIRTUAL PRIVATE NETWORK SITES

CROSS REFERENCE TO RELATED APPLICATIONS

This application claims priority to U.S. Provisional Patent Application No. 60/449,641, filed Feb. 24, 2003, and is also related to U.S. patent application Ser. No. 10/617,011, filed Jul. 10, 2003, entitled METHOD AND APPARATUS FOR ENHANCING RESILIENCY IN VIRTUAL PRIVATE NETWORKS, the content of each of which is hereby incorporated herein by reference.

BACKGROUND OF THE INVENTION

1. Field of the Invention

The present invention relates to communication networks and, more particularly, to a method and apparatus for exchanging routing information between virtual private network sites.

2. Description of the Related Art

Data communication networks may include various computers, servers, nodes, routers, switches, hubs, proxies, and other devices coupled to and configured to pass data to one another. These devices will be referred to herein as "network devices." Data is communicated through the data communication network by passing data packets (or data cells or segments) between the network devices by utilizing one or more communication links. A particular data packet may be handled by multiple network devices and cross multiple communication links as it travels between its source and its destination over the network.

The various network devices on the communication network communicate with each other using predefined sets of rules, referred to herein as protocols. Different protocols are used to govern different aspects of the communication, such as how signals should be formed for transmission between network devices, various aspects of what the data packets should look like, and how packets should be handled or routed through the network by the network devices.

A Virtual Private Network (VPN) may be formed by securing communications between two or more networks or network devices to form a VPN tunnel, such as by encrypting or encapsulating transmissions between the networks or network devices. Using VPN tunnels over a public network such as the Internet enables information to be exchanged securely between geographically dispersed sites without obtaining dedicated resources through the public network.

To enable devices on one VPN site to communicate with devices on another VPN site via the VPN tunnel, it is necessary to exchange routing information between the two VPN sites. Likewise, as network devices are added and removed from the networks, or as problems are encountered and fixed in the networks, the routing tables need to be updated and advertised to the other participating sites in the VPN.

There are currently two commonly utilized methods of establishing VPN tunnels on a network. The first model is described in Internet Engineering Task Force (IETF) Request For Comments (RFC) 2547, the content of which is hereby incorporated herein by reference. RFC 2547 describes a VPN architecture in which MultiProtocol Label Switching (MPLS)-based tunnels are used to forward packets over the network backbone. An instance of Border Gateway Protocol (BGP) is used to distribute routes over the backbone for all VPNs provisioned through a particular Provider Edge network device (PE). Routing information for each VPN serviced by a PE is stored in a separate VPN routing and forwarding table (VRF) or a distinguishable area of the PE's common VRF. VPNs established utilizing the 2547 VPN model will be referred to herein as "VRF-based VPNs."

A second model for establishing VPN tunnels through a network is based on the concept of a Virtual Router (VR). A virtual router is a software construct in a physical router that has all the attributes of a physical router, but which shares processor time, switch plane resources, and other physical resources of the physical router. Because the virtual router is logically separate from other virtual routers, it has its own routing space, its own policy information, and is able to be provisioned much the same as any other router on the network. Virtual router based VPNs (VR-based VPNs) are described, for example, in an IETF Internet-Draft by Paul Knight, et al., entitled "Network-based IP VPN Architecture using Virtual Routers," July 2002, the content of which is hereby incorporated herein by reference.

Both VR-based VPNs and VRF-based VPNs have been widely deployed on existing communications networks. Unfortunately, despite this wide-spread deployment, the two models are unable to be easily interconnected due to differences in the way in which they are constructed, the type of routing information utilized by the different models, and the manner in which routing information is distributed in the different models. To enable customers and service providers to deploy the VPN model best suited to the particular circumstances based on customer needs and network resources, and to allow customers to migrate between the two models, it would be advantageous to be able to interconnect VPNs regardless of what VPN model is implemented at a particular VPN site.

SUMMARY OF THE INVENTION

The present invention overcomes these and other drawbacks by providing an apparatus and method for exchanging routing information between differently configured VPN sites. According to one embodiment of the invention, a VR-based VPN site and a VRF-based VPN site may be interconnected and exchange routing information through a VR-VRF gateway.

The VR-VRF gateway enables VPN sites utilizing different VPN models to exchange routing information and communicate with each other over a VPN tunnel. According to an embodiment of the invention, each VPN site attached to a particular VPN provides routing information for the VPN to the VR-VRF gateway which stores the routing information in a routing table for that VPN. The routing information is then distributed by the VR-VRF gateway to the other VPN sites so that all sites are provided with routing information. When the VR-VRF gateway receives a packet of data to be passed over the VPN tunnel, it accesses the routing table for the particular VPN to ascertain how the packet is to be routed, or the next hop attribute for the packet, depending on the direction in which the packet is to be forwarded. Where the VR-VRF gateway is not configured to handle data traffic on the VPN tunnel, it populates routing entries on another network device on the VPN tunnel to enable the other network device to handle the actual traffic over the VPN tunnel. Thus, the VPN sites are interconnected by the VR-VRF gateway, which facilitates the exchange of routing information between the two VPN sites and the forwarding of packets between the two VPN sites.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

FIG. 4 is a functional block diagram of one example of a routing table for use by the VR-VRF gateway according to an embodiment of the invention;

FIG. 5 is a functional block diagram of a redundant network according to an embodiment of the invention;

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

As described in greater detail below, a VR-VRF gateway enables VPN sites utilizing different VPN models to exchange routing information and communicate with each other over a VPN tunnel. According to an embodiment of the invention, each VPN site attached to a particular VPN provides routing information for the VPN to the VR-VRF gateway which stores the routing information in a routing table for that VPN. The routing information is then distributed by the VR-VRF gateway to the other VPN sites so that all sites are provided with routing information. When the VR-VRF gateway receives a packet of data to be passed over the VPN tunnel, it accesses the routing table for the particular VPN to ascertain how the packet is to be routed, or the next hop attribute for the packet, depending on the direction in which the packet is to be forwarded. Where the VR-VRF gateway is not configured to handle data traffic on the VPN tunnel, it populates routing entries on another network device on the VPN tunnel to enable the other network device to handle the actual traffic over the VPN tunnel. Thus, the VPN sites are interconnected by the VR-VRF gateway, which facilitates the exchange of routing information between the two VPN sites, and facilitates the forwarding of packets between the two VPN sites.

Allowing communication between VPN sites regardless of the technology selected to implement VPN tunnels on the network enables the VPN sites to choose a VPN model that works best in the particular situation, as well as enables VPN sites to migrate from one VPN model to another.

Figure 1:
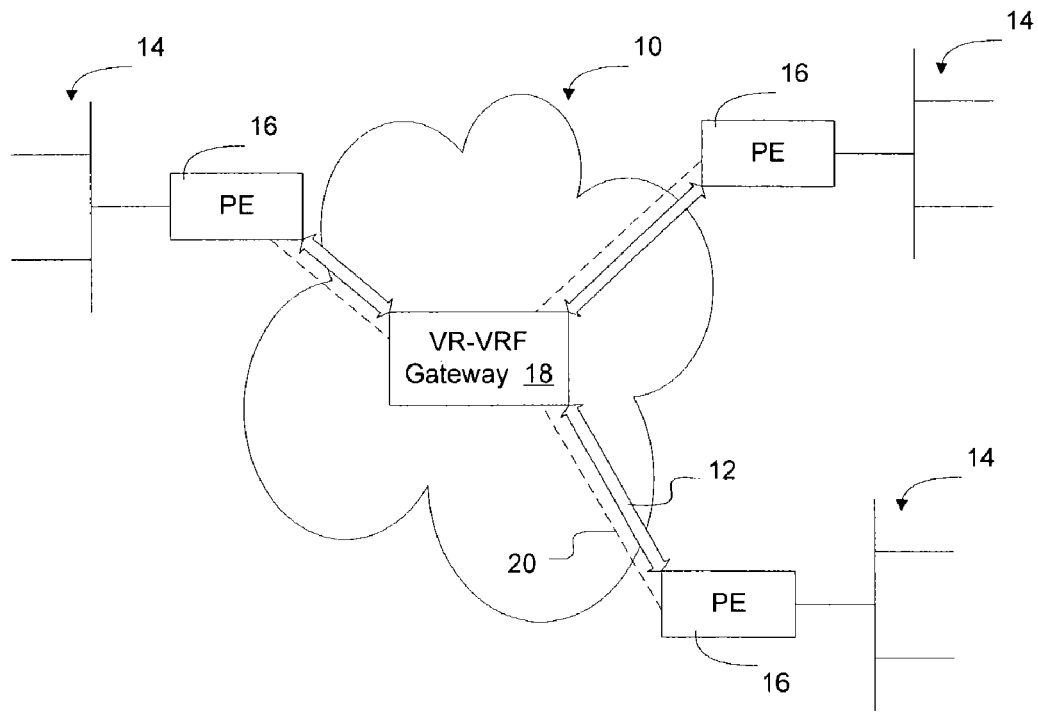
FIGS. 1 and 2 are functional block diagrams of networks including a VR-VRF gateway according to an embodiment of the invention.

One example of a network 10 employing virtual private network (VPN) tunnels 12 to interconnect VPN sites 14 is illustrated in FIG. 1. As shown in FIG. 1, VPN tunnels 12 may be used to interconnect two or more VPN sites 14 across a public network 10, such as the Internet, using any conventional means. In the example illustrated in FIG. 1, three provider edge (PE) network devices 16 are interconnected by VPN tunnels 12. While this invention will be described as using VPN tunnels configured over a public network such as the Internet, it should be apparent that the invention is not limited to VPN tunnels configured through the Internet, but rather extends to other types of virtual circuits formed over any type of communications network. Likewise, while three PE network devices are illustrated in this network as being interconnected via three VPN tunnels, the invention is not limited to a network of this topography, as any number of PE network devices and VPN tunnels may be employed.

According to an embodiment of the invention, a VR-VRF gateway 18 is provided on the network to facilitate transmission of data packets and routing information between PE network devices 16 associated with VPN end sites 14. The VR-VRF gateway, in one embodiment, is configured to provide a routing table on the network that may be updated and accessed by a VPN tunnel instantiated utilizing a virtual router model as well as a VPN tunnel instantiated utilizing a routing and forwarding table approach. The VR-VRF gateway accomplishes this by enabling VPN identification information to be mapped from one model to the other, such that, for example, the VPN identifier of a VR-based VPN may be mapped to the proper route target in a VRF-based VPN.

Figure 2:
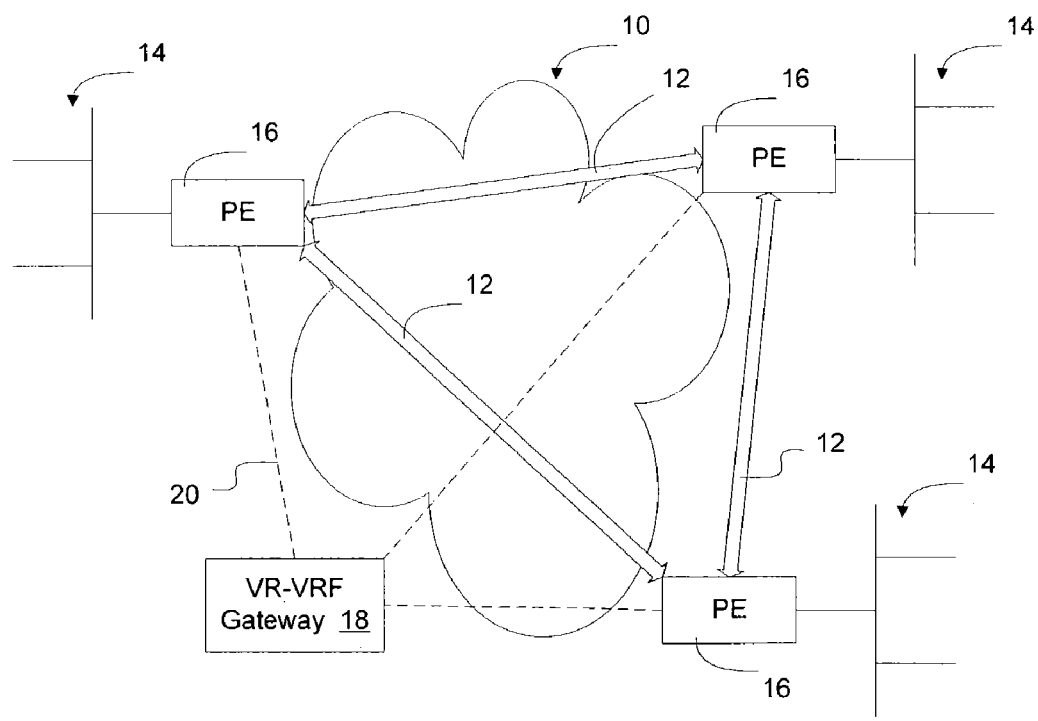

FIGS. 1 and 2 illustrate two scenarios in which VR-VRF gateway 18 is able to facilitate transmission of data packets and routing information between PE network devices 16. In the embodiments shown in FIGS. 1 and 2, the VR-VRF gateway receives routing information from a PE 16 participating in a VPN tunnel, and passes that routing information to other PEs configured to participate in the VPN tunnel. The exchange of routing information is illustrated using dashed lines 20 in FIGS. 1 and 2. In the embodiment illustrated in FIG. 1, the VR-VRF gateway facilitates transmission of data packets by intercepting packets being sent between PEs 16 participating in the VPN tunnel, and performing packet header modification operations on the packets to enable the packets to be transmitted and received over the VPN tunnel. In the embodiment of FIG. 2, the VR-VRF gateway does not intercept packets on the VPN tunnel, but rather facilitates transmission of data packets by passing information to another network device to enable the other network device to map VPN identifiers from one VPN model to the other. The other network device may be one of the PE network devices or a network device on the route between the PEs that is configured to participate in the VPN tunnel.

While a single VR-VRF gateway may be configured on the network 10, as illustrated in FIGS. 1 and 2, additional VR-VRF gateways may also be configured to provide redundancy should there be a problem with the primary VR-VRF gateway or with obtaining access to the primary VR-VRF gateway. Redundant VR-VRF gateways are described in greater detail below in connection with Fig. R. Additionally, the VR-VRF gateway may handle data traffic for some VPNs and not others, and the invention is not limited to a VR-VRF that facilitates transmission of data packets in only one way.

The VR-VRF gateway may be located at any convenient location on the network. For example, a service provider will generally maintain a centralized VPN management center to manage VPN services for subscribers. The VPN management center generally functions to configure the CE network devices, handle communications between VPN customers and the service provider, monitor the status of the VPN networks, and provide any other services necessary or convenient to the VPN network and customers. Optionally, the VR-VRF gateway may be collocated with the service provider's VPN management center to facilitate communications between the VR-VRF gateway and the other devices in the VPN management center, although the invention is not limited in this regard.

Figure 3:
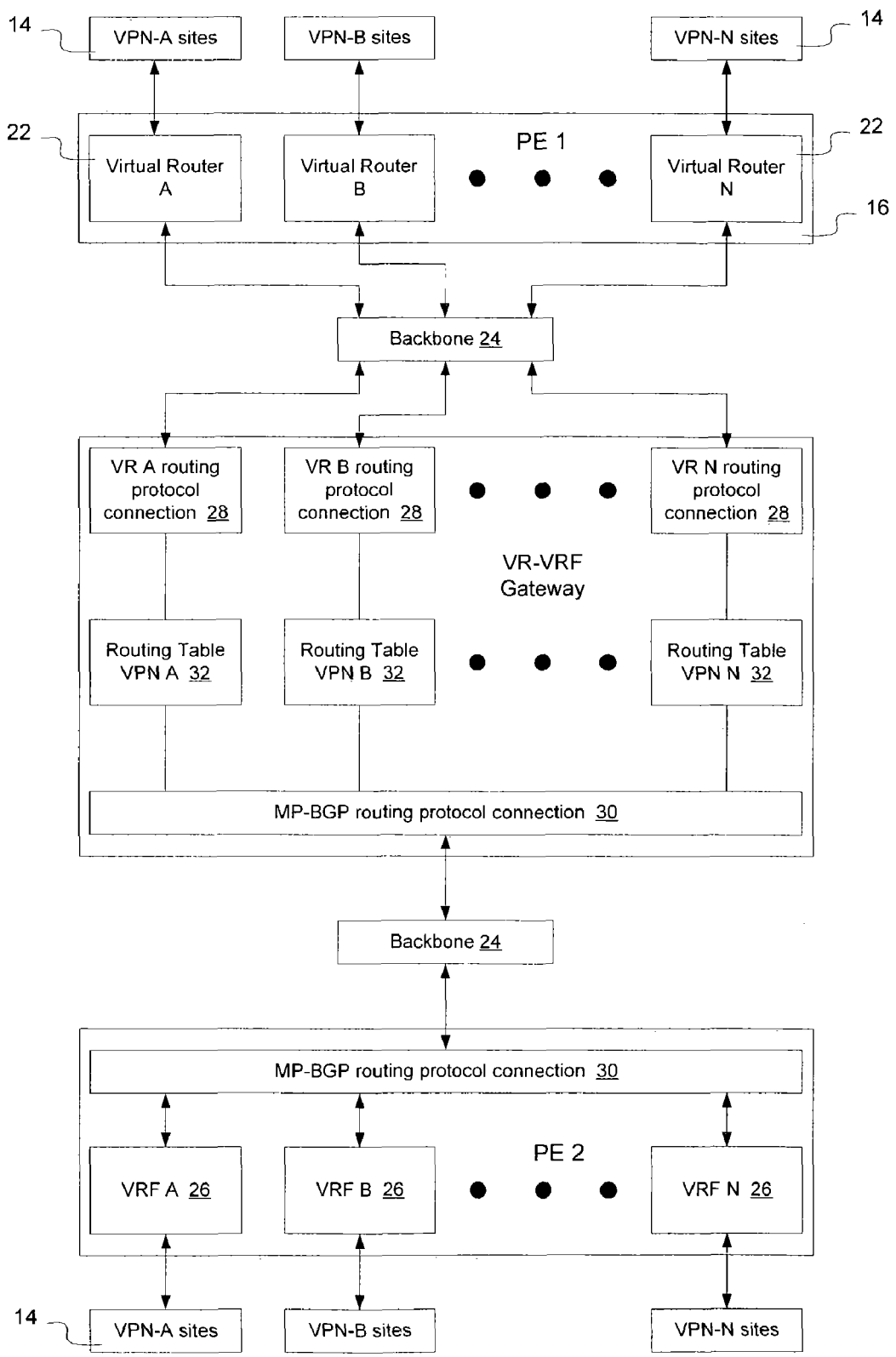
FIG. 3 is a functional block diagram illustrating an interconnection of VR-based VPNs and VRF-based VPNs via a VR-VRF gateway according to an embodiment of the invention.

FIG. 3 illustrates one embodiment of the invention in which a VR-VRF gateway 18 is configured to enable a VPN tunnel to be formed between VPN sites implementing different VPN models. As described in greater detail below, the VR-VRF gateway according to one embodiment of the invention enables a VPN site implementing a VR-based VPN to participate on a VPN tunnel with a VPN site implementing a VRF-based VPN by collecting and distributing routing information between the VPN sites and facilitating the forwarding of packets between the VPN sites. In the embodiment illustrated in FIG. 3, PE 1 is implemented a VR-based VPN, and PE 2 is implementing a VRF-based VPN. The invention is not limited to this embodiment, as other VPN models may be utilized as well.

As shown in FIG. 3, PE 1 includes virtual routers 22 configured to provide VPN services to VPN sites 14. Each VPN, in the VR-based VPN model, is provided with a dedicated virtual router to enable communication over the network appear to be provided by a router dedicated to servicing that particular VPN. Thus, as shown in FIG. 3, virtual router A services VPN-A sites, and virtual router B services VPN B sites. VPN sites 14 typically are customer edge (CE) network devices, although the invention is not limited in this regard. Multiple virtual routers may be included to service other VPN sites, and the invention is not limited to a PE including any particular number of virtual routers.

The VPNs configured through PE1 may be configured to exchange routing information over the VPN tunnels using a routing protocol such as Open Shortest Path First (OSPF), Integrated Intermediate System to Intermediate System (Integrated IS-IS), Routing Information Protocol (RIP), or Border Gateway Protocol (BGP). VPNs A-N are connected to the VR-VRF gateway 18 over backbone 24.

VPNs are also provisioned on PE 2 and connected to the VR-VRF gateway 18 over backbone 24. PE 2, in this embodiment, includes VPN routing and forwarding tables 26 to enable PE 2 to implement VRF-based VPN services for VPN sites 14. Each VPN, in the VRF-based VPN model, is provided with a separate VRF table or a separate area of a common VRF table to isolate the VPNs serviced by the PE. VPN sites 14 typically are customer edge (CE) network devices, although the invention is not limited in this regard.

In the current implementation of the VRF-based VPN model, routing information is transmitted between PE 2 and the VR-VRF gateway 18 via MultiProtocol Border Gateway Protocol (MP-BGP). MP-BGP enables BGP to carry routing information for multiple network layer routing protocols, e.g., IPv6, IPX, VPN-IPv4, and other similar protocols. The invention is not limited to this embodiment, but rather extends to all routing protocols that may be used to exchange routing information between PE2 and VR-VRF gateway 18.

VR-VRF gateway 18 contains protocol connections 28, 30, to enable it to interface with PE1 and PE2, as well as routing tables 32 to enable it to map VPN ID information from one VPN model to the other. In the embodiment of FIG. 3, the VR-VRF gateway contains a virtual router (VR) routing protocol connection 28 for each virtual router configured to interface with the VR-VRF gateway 18. Thus, in the example illustrated in FIG. 3, VR-VRF gateway 18 includes N VR routing protocol connections 28. The VR routing protocol connections 28 enable the VR-VRF gateway 18 to be interconnected with the virtual routers on PE 1 and other PE network devices configured to utilize the services of the VR-VRF gateway 18.

Similarly, the VR-VRF gateway 18 also contains an MP-BGP routing protocol connection 30 to enable VR-VRF gateway 18 to support a BGP peering session with PE2, to allow it to receive routing information associated with the VRFs over backbone 24. The PE2 is the VRF-based VPN model is a network device that is acting as a router with a plurality of routing tables (VRFs). Thus, a single MP-BGP routing protocol connection 30 may be instantiated for each PE handling VRF-based VPNs. Routing Information for the VRFs instantiated on that PE is transferred over the BGP instance to/from the VR-VRF gateway.

VR-VRF gateway 18 also contains routing tables 32 for each VPN supported by the VR-VRF gateway. These tables may be stored in separate memory areas or partitions of a large memory area. Each routing table 32 is identified with the respective virtual router and VRF for the particular VPN. Accordingly, in the example illustrated in FIG. 3, the routing table for VPN A is registered with VR A and VRF A such that the VPN identifier in the context of VR A is mapped to the Route Target for VRF A. Similarly, the routing table for VPN B is registered with VR B and VRF B, such that the VPN identifier in the context of VR B is mapped to the Route Target for VRF B.

FIG. 4 illustrates one example of a routing table 32 that may be utilized to implement an embodiment of the invention. As shown in FIG. 4, routing table 32 includes a plurality of entries 50, each of which are configured to contain and associate routing information for a particular route through a VPN tunnel. In the embodiment illustrated in FIG. 4, each entry 50 includes a virtual router VPN identifier (VR VPN ID) and VR routing information for a particular route on that VPN. The entry also includes an associated VRF VPN identifier VRF VPN ID and BGP next hop attribute and MPLS VPN label for the route on the VRF-based VPN. According to one embodiment, the VRF VPN ID can be one or more VRF route targets or route distinguishers.

When a packet arrives with a particular VR VPN ID, the VR-VRF gateway or other network device charged with forwarding packets on the VPN tunnel looks at the routing information, indexes into the table using the VR VPN ID and the routing information to find the proper entry 50, and ascertains the BGP next hop and MPLS VPN label for that route. Similarly, when a packet arrives from the VRF-based VPN site, the VR-VRF gateway or other network device indexes into the table using the VRF VPN ID and BGP next hop and MPLS VPN label information to ascertain the proper routing information to be used to forward the packet to the VR-based VPN.

Routes between PE1 and the VR-VRF gateway are exchanged according to the VR model. Routes learned by the VR-VRF gateway 18 from the virtual routers 22, are placed into the routing tables 32. Routes between the VR-VRF gateway and PE2 are exchanged according to the VPN model described in IETF 2547. Routes learned by the VR-VRF gateway from PE2 are also placed into the routing tables 32 with appropriate mapping of the VRFs as mentioned above.

In operation, routing table 32 on the VR-VRF gateway will import routes learned by VR A on PE1 and will export then to VRF A on PE2. Routing table 32 on the VR-VRF gateway will also import routes learned by VRF A on PE2 and will send them to VR A on PE1. Similar operations are performed by the VR-VRF gateway for VPN B and other VPNs utilizing the VR-VRF gateway. According to an embodiment of the invention, by implementing a single routing table for each VPN, and using this routing table to collect and disseminate routes for the VR-based side of the VPN as well as the VRF-based side of the VPN, it is possible to enable VR-based VPNs to exchange routing information with VRF-based VPNs.

Routes learned by PE1 about PE2 will be installed on PE1 and point to the VR-VRF gateway. The routes learned by PE1 about PE1 will be installed on PE2, and will have the VR-VRF gateway as the BGP next hop. Accordingly, PE1 and PE2 are able to communicate with each other, even though they utilize different routing protocols and are instantiated using different VPN models, since each is able to address and send packets through the VR-VRF gateway.

When a packet to be forwarded over a VPN tunnel arrives at PE 16, the PE ascertains which virtual router should handle the packet by determining the VPN over which the packet should be forwarded. Upon ascertaining the proper VPN for the packet, the PE 1 will access a forwarding information base associated with that virtual router 22 (tunnel interface) and, based on the header information associated with the packet, will obtain the tunnel endpoint for the packet. In the case where the packet is to be transmitted to PE2, the tunnel endpoint will be the VR-VRF gateway. Encryption or encapsulation may be used to form a tunnel between PE1 and the VR-VRF gateway and the invention is not limited to any particular method of forming the tunnel. The packet will then be forwarded over the tunnel to the VR-VRF gateway.

When the packet arrives at the VR-VRF gateway, the outer header of the packet is removed and the VR-VRF gateway will perform a VPN Forwarding Information Base (FIB) lookup on the inner packet on the routing table 32 associated with the VPN. The VR-VRF gateway will obtain from the table lookup a BGP next-hop and a MPLS VPN label which are then used to forward the packet over a tunnel to PE2. The tunnel between VR-VRF gateway and PE2 may be formed using MPLS LSP, IPSec, GRE, or any other conventional protocol configured to encapsulate or encrypt the packets or otherwise secure the packets on the network.

When the packet arrives at PE2, the BGP-next hop label is stripped off the packet and a FIB lookup is performed on the appropriate VRF 26 using the MPLS VPN label. The result of the FIB returns the appropriate VPN site to which the packet is to be delivered.

Since the VR-VRF gateway exchanges routing information to be used to communicate over VPN tunnels, it may be advantageous to utilize secure transmissions of routing information between the VR-VRF gateway and PE1, and between the VR-VRF gateway and PE2. Accordingly, it may be advantageous to establish IPSec tunnels between the PE devices and the VR-VRF gateway to exchange routing information.

Virtual routers are able to provide Quality of Service (QoS) by utilizing constructs such as classification, policing, shaping, rate limiting and intelligent dropping to offer service commensurate with the VPN subscriber's service level agreement (SLA). Most commonly it is applied in adherence to Differentiated Services (Diffserv), an architecture for providing different types or levels of service for network traffic. It is possible to apply Diffserv in the VR+VRF Gateway when a packet traverses from a VR domain to a VRF domain. Additionally, the experimental bits in the MPLS VPN label can also be marked differently, depending on different policies defined in the VR-based VPN, to enable the VRF-based VPN to implement similar to QoS policies in the VRF domain.

Where the VR-VRF gateway is configured to handle data traffic for all VPNs serviced by the gateway, the VR-VRF may become a bottleneck as it may not be configured to handle extremely large volumes of data. Additionally, it may be desirable to implement the VR-VRF gateway as a relatively low throughput network device and have the backbone routers and provide edge routers handle traffic directly for the VPNs. Accordingly, in some instances it may be desirable to enable the PEs to communicate directly with each other and to utilize the VR-VRF gateway to establish a tunnel between the two PEs.

VR-based VPN tunnels are often formed by encapsulation, such as using IPSec or Generic Routing Encapsulation (GRE), a protocol which allows an arbitrary network protocol A to be transmitted over any other arbitrary network protocol B, by encapsulating the packets of A within GRE packets, which in turn are contained within packets of B. MPLS LSP tunnels are not commonly used to tunnel VPN traffic in a VR-based VPN. Hence, to tunnel traffic between the two different VPN modules, it is preferable to use either IPSec or GRE on both sides of the VPN tunnel. The type of encapsulation to be used for the VPN may be communicated between the end points using a tunnel type attribute.

To directly connect PE 1 and PE2 it is also necessary to distribute routes associated with VPN sites (CE devices). According to one embodiment of the invention, BGP is utilized in both the VR and VRF domains, and BGP routes are exchanged between the PE network devices.

In order to have direct connectivity of tunnels between the PE's, routes from the VR domain, with its originator's addressed, are mapped to BGP next-hop attribute, while distributing in the VRF domain and vice versa. If the protocol used in VR domain is different than BGP, for example OSPF, then the originator address is mapped to a forwarding address in case of type 2 LSA (Link State Advertisement). Similar mapping needs to be done if other protocols are used in the VR-based VPN domain. Thus the route installed in the VRF domain will point directly to the PE originating the reachability and vice versa.

Sending traffic directly between the PEs, instead of de-capsulation and encapsulation at the VR-VRF gateway, allows VPNs traffic to be handled by high capacity network devices, which may be particularly advantageous in large-scale high capacity VPNs. It also accelerates transmission of packets between VPN sites by not requiring the packets to be tunneled twice—once between the first VPN site and the VR-VRF gateway, and once between the VR-VRF gateway and the other VPN site. In this embodiment, routing information may be passed by the VPN sites through the VR-VRF gateway, and shared by the VR-VRF gateway with the network devices handling the tunnel traffic using a conventional protocol such as OSPF, BGP, or any other routing information exchange protocol.

In some network scenarios it may be advantageous to use more than one gateway device for network resiliency. In this situation, multiple VR-VRF gateway devices will be importing and exporting routes between each VPN network model. In order to allow optimal routing between both network models, a mapping of the associated metrics used by the Interior Gateway Protocol (IGP) on the VR network can be mapped to the Local-Pref value in the MP-BGP update messages being announced in the BGP/MPLS model. If BGP is used as the routing protocol for both the VR model and the BGP/MPLS model then BGP interworking methods can be used.

FIG. 5 shows an example of a VPN network in which two VR-VRF gateway devices interconnect VPN sites on PE1 and VPN sites on PE2. To enable routes through one of the VR-VRF gateways to be selectable using established methods, routing protocol cost metrics may be mapped to local cost preferences. For example, in FIG. 5, it will be assumed that PE1 is implementing VR-based VPNs and that PE2 is implementing VRF-based VPNs. It will also be assumed that all VRs in the VR model are using OSPF for distribution of VPN routing information on a per VPN basis. In this example, a cost will be assigned to reach each VR-VRF gateway (PE-5 and PE-6) on the network. In the example shown in FIG. 5, if each link has the same cost, then the cost to reach PE6 will be lower than the cost to reach PE5.

To provide more flexibility and efficient routing between the BGP/MPLS network and the VR network, the associated OSPF costs can be mapped to the Local-Pref attribute in the Update messages originated by each gateway. When PE-7 receives Update messages from both PE-5 and PE-6 it can choose PE-6 as its preferred MP-BGP next-hop for routes originating from PE-1.

Also for routing information being imported from the BGP/MPLS network on a per VPN basis, routes learned from BGP peers can be distributed as external routes if an IGP based protocol, such as OSPF, is used for VPN route distribution in the VR model.

While this example has used specific protocols to help provide an understanding of how to implement multiple VR-VRF gateways in a network architecture, the invention is not limited to this particular example or the particular selected protocols.

In a VRF-based VPN model there is only one routing instance that is tasked with exchanging VPN reachability information for all VPNs associated with the PE. Although this is advantageous in that there is no issue with scalability (a given router only has sufficient stack space to host a set number of virtual routers), it creates a single point failure on the network. Specifically, a failure on the MP-BGP connection will result in losing connectivity for all VPNs associated with that PE.

To overcome this problem, according to an embodiment of the invention, a VR-based VPN can be configured as a backup for the VRF-based VPN. The VR-based VPN, since it has its own routing instance, will not be affected by the failure of the MP-BGP connection. The backup VR-based VPN can receive routing information from the VR-VRF gateway without requiring the VRF-based VPN to communicate routing information. Accordingly, utilizing a VR-VRF gateway enables redundancy to be provided to VRF-based VPNs by instantiation of a VR-based VPN.

Figure 6:
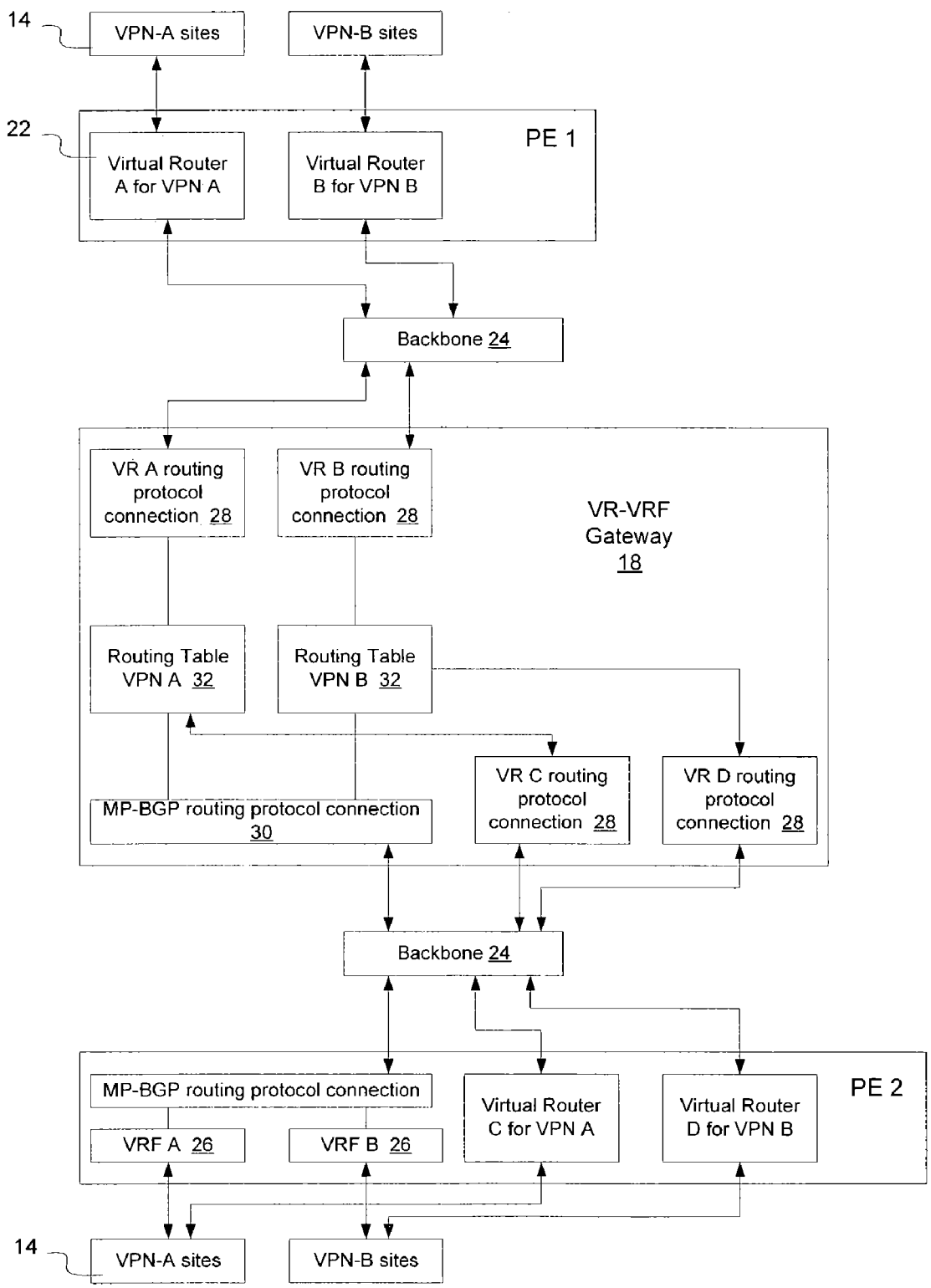
FIGS. 6 and 7 are functional block diagrams illustrating use of a VR-VRF gateway to provide VR-based VPN redundancy to VRF-based VPNs according to an embodiment of the invention.

FIG. 6 illustrates an embodiment of the invention in which the VR-VRF gateway enables VR-based VPNs to provide redundancy to VRF-based VPNs. As shown in FIG. 6, a VR-VRF gateway 18 may be implemented in a manner similar to the embodiment illustrated in FIG. 3. In this embodiment, as in the embodiment illustrated in FIG. 3, VRFs A and B both rely on MP-BGP routing protocol connection 30 with VR-VRF gateway, which represents a single point of failure. To provide redundancy to this single point of failure, VR-based VPNs are instantiated between PE2 and the VR-VRF gateway 18. VR-based VPN C in this embodiment provides redundancy to VRF-based VPN A, and VR-based VPN D provides redundancy to VRF-based VPN B. Routing information associated with VPN A is populated to VR C on PE2, and routing information associated with VPN B is populated to VR D on PE2. If there is a failure on the VRF-based VPN network connecting PE 2 and VR-VRF gateway 18, VR C and VR D can assume responsibility for VPN tunnels A and B, respectively, to enable continued connectivity over these tunnels to the VPN end sites.

While this embodiment has been described in connection with two VPN tunnels connected through PE2, the invention is not limited in this manner, but rather extends to any number of VPN tunnels. Additionally, the invention is not limited to implementing VR C and VR D on PE2, as these virtual routers may be implemented on another network device connected to VPN sites A and B without departing from the scope of the invention.

Figure 7:
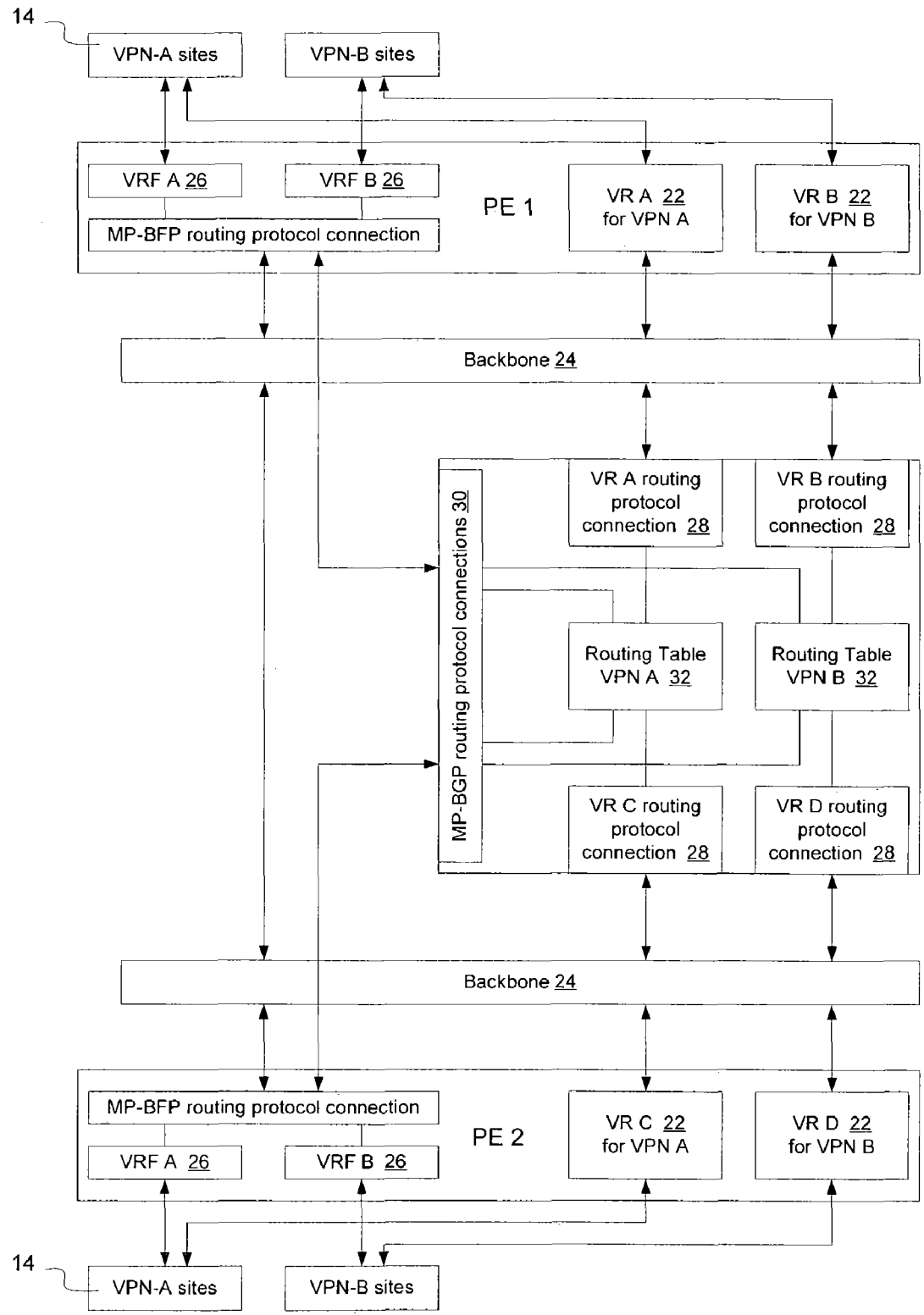

FIG. 7 illustrates another embodiment of the invention in which redundancy is provided to VRF-based VPNs through the implementation of a VR-VRF gateway 18. As shown in FIG. 7, VRF-based VPNs may be implemented in a standard manner between PE1 and PE2. To provide redundancy for VRF-based VPN A and VRF-based VPN B, VR-VRF gateway 18 is provided with routing information associated with VPN A and VPN B through MP-BGP routing protocol connections 30. Specifically, in this embodiment PE1 will establish a MP-BGP peering session with PE2 as well as with VR-VRF gateway 18, and PE2 will establish a MP-BGP peering session with PE1 as well as with VR-VRF gateway 18. VR-VRF gateway 18 thus is able to obtain routing information from both PE 1 and PE2, which is stored in routing tables 32 in a manner similar to that as described above.

VR-based redundant VPNs are also established between PE1 and VR-VRF gateway 18, and between VR-VRF gateway 18 and PE2. Route information discovered by VRs A-D is transmitted to VR-VRF gateway 18 and stored in routing tables 32 in a manner similar to that described above. VR-VRF gateway 18 thus has up-to-date routing information in routing tables 32 that will enable it to facilitate transmission of routing information over VPN A or VPN B should the primary VRF-based tunnel between VPN A sites or VPN B sites be compromised.

For example, assume that there is a problem on the network and connectivity between PE1 and PE2 is affected such that VPN tunnels A and B are terminated. PE1, upon detecting that there is a problem with the network, will transmit data packets for VPN tunnel A through VR-based redundant VPN tunnel via VR A, and will transmit data packets for VPN tunnel B through VR-based redundant VPN tunnel via VR B. If the MP-BGP connection between VR-VRF gateway 18 and PE 2 is not affected by the problem on the network, the VR-VRF gateway 18 may continue to utilize VRF-based VPN tunnels between itself and PE2 so that data transmission on tunnels A and B appears to be unaffected to PE2. Alternatively, and if necessary, the VR-VRF gateway may cause the tunnels to be passed through virtual routers C and D on PE2. Thus, redundancy may be accomplished between PE1 and PE2. The invention is not limited to this particular embodiment of providing redundancy, as many other embodiments and scenarios may be envisioned.

Figure 8:
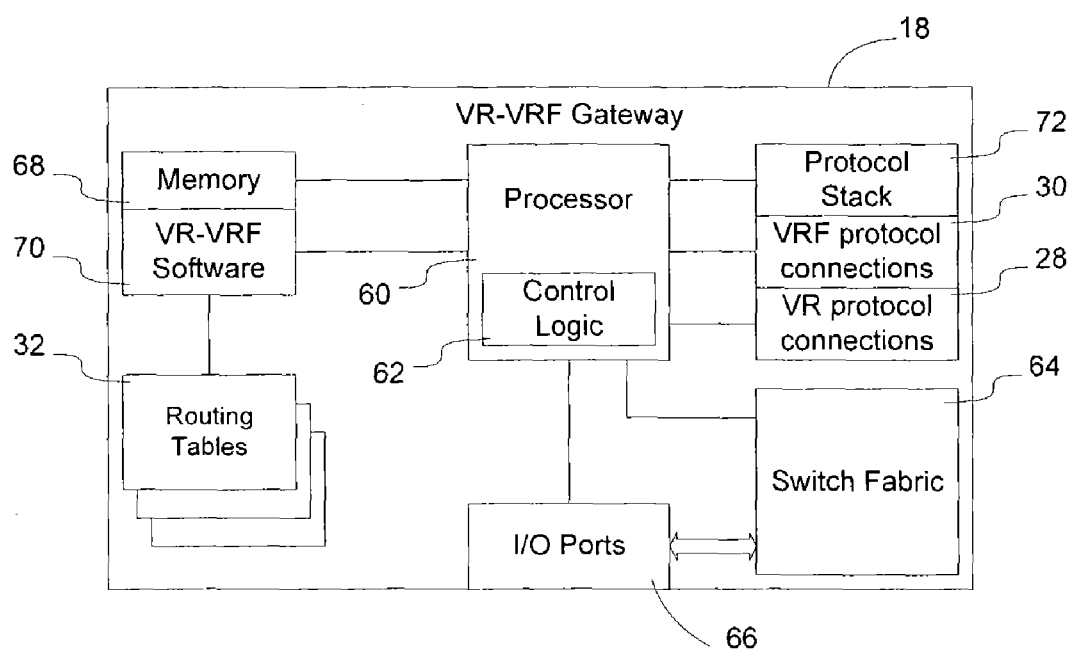
FIG. 8 is a functional block diagram of a VR-VRF gateway network device according to an embodiment of the invention.

One example of a VR-VRF gateway 18 according to an embodiment of the invention is illustrated in FIG. 8. As shown in FIG. 8, the VR-VRF gateway 32 in this embodiment includes a processor 60 containing control logic 62 configured to implement the functions ascribed to the VR-VRF gateway 18 discussed herein in connection with FIGS. 1-7. The VR-VRF gateway may be a personal computer, server, or other processing device, capable of processing instructions to implement the functions of the VR-VRF gateway 18 discussed herein. Alternatively, the VR-VRF gateway may be embodied on a network device including a switch fabric 64 or other hardware, firmware, and/or software, to enable the network device to perform functions commonly ascribed to a router or switch to enable the network device handle packet traffic over the VPNs. Network ports 66 are provided to enable the network device to receive data packets from the communications network and to output data packets onto the communications network.

The VR-VRF gateway 18 may be a separate device/machine on the network. Alternatively, the VR-VRF gateway 18 may be instantiated as a process on another network device. The invention is not limited to any particular implementation on the network. Likewise, the invention is not limited to a particularly type of processing apparatus or network device.

A memory 68 includes data and instructions to enable the processor to implement the functions ascribed to the VR-VRF gateway 18 and contained in VR-VRF software 70. The VR-VRF software 70 interfaces with routing tables 32 to map routes between VPN models. A protocol stack 72 is provided to enable the processor to communicate with other network devices using established protocols. VRF protocol connections 30 and VR protocol connections(s) 28 enable the network device to participate in the exchange of routing information with the VRF-based VPN sites and VR-based VPN sites.

The VR-VRF gateway may include additional or alternate components/processes configured to facilitate deployment of the functionality ascribed to it herein. The invention is thus not limited to a VR-VRF gateway or a system employing a VR-VRF gateway with only the enumerated components discussed herein, but rather extends to any VR-VRF gateway performing the functions described herein and as set out in the claims.

The control logic 62 may be implemented as a set of program instructions that are stored in a computer readable memory within the network device and executed on a microprocessor, such as processor 60. However, in this embodiment as with the previous embodiments, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of exchanging routing information between Virtual Private Network (VPN) sites, the method comprising the steps of:

receiving, by a network device, first routing information from a first VPN site, the first VPN site being a Virtual Router (VR)-based VPN site implemented using a VR-based VPN model, the first routing information being associated with a first VPN;

receiving, by the network device, second routing information from a second VPN site, the second VPN site being a Virtual Routing and Forwarding (VRF)-based VPN site implemented using a VRF-based VPN model, the second routing information also being associated with the first VPN; and storing the first routing information and the second routing information together in a common routing table for the first VPN.

2. The method of claim 1, wherein the routing table or entries in the routing table is used to facilitate transmission of data between the first VPN site and the second VPN site.

3. The method of claim 1, further comprising utilizing the routing table by the network device to facilitate transmission of data between the first VPN site and the second VPN site.

4. The method of claim 1, further comprising transmitting, by the network device, the first routing information to the second VPN site.

5. The method of claim 1, further comprising transmitting, by the network device, the second routing information to the first VPN site.

6. The method of claim 1, wherein the first routing information is associated with a first virtual router protocol connection, the first virtual router protocol connection being based on at least one of Open Shortest Path First (OSPF), Integrated Intermediate System to Intermediate System (Integrated IS-IS), Routing Information Protocol (RIP), and Border Gateway Protocol (BGP), which is used to exchange the first routing information with the first VPN site over the first VPN.

7. The method of claim 1, wherein the second routing information is associated with a second protocol connection between the second VPN site and the network device, the second protocol connection being based on MultiProtocol Border Gateway Protocol (MP-BGP), the second protocol connection being used to exchange the second routing information with the second VPN site over the first VPN.

8. The method of claim 1, wherein the routing table comprises entries comprising a VPN identifier associated with the first routing information, and a VPN identifier associated with the second routing information.

9. The method of claim 8, wherein the entries further comprise the first routing information and the second routing information.

10. The method of claim 9, wherein the first routing information is a route from the network device to the first VPN site, and wherein the second routing information is a Border Gateway Protocol (BGP) next hop attribute and MultiProtocol Label Switching (MPLS) VPN label.

11. The method of claim 10, further comprising the steps of:

establishing a first secure tunnel between the first VPN site and the network device, and wherein the step of receiving first routing information utilizes the first secure tunnel; and establishing a second secure tunnel between the second VPN site and the network device, and wherein the step of receiving second routing information utilizes the second secure tunnel.

12. A method of interconnecting a Virtual Private Network (VPN) tunnel between a first VPN site implementing a Virtual Router based VPN (VR-based VPN), and a second VPN site implementing a VPN Routing and Forwarding table based VPN (VRF-based VPN), the method comprising the steps of:

collecting routing information from the first VPN site implementing the VR-based VPN;

collecting routing information from the second VPN site implementing the VRF-based VPN;

correlating the routing information from the VR-based VPN and the routing information from the VRF-based VPN; and storing the correlated routing information in a VPN routing information base.

13. The method of claim 12, further comprising the step of:

disseminating the correlated routing information to the VR-based VPN and the VRF-based VPN.

14. The method of claim 12, further comprising the steps of:

receiving a data packet having a header from the first VPN site implemented using the VR-based VPN;

ascertaining first destination information from the header;

obtaining first correlated routing information from the VPN routing information base based on the first destination information; and adding second destination information to the data packet from the correlated routing information to enable the data packet to be forwarded toward the second VPN site implemented using the VRF-based VPN.

15. The method of claim 14, further comprising the step of:

transmitting the data packet to the second VPN site implemented using the VRF-based VPN.

16. The method of claim 12, further comprising the steps of:

receiving a packet having a header from the second VPN site implemented using the VRF-based VPN;

ascertaining third destination information from the header;

obtaining second correlated routing information from the VPN routing information base based on the third destination information; and adding fourth destination information to the data packet from the correlated routing information to enable the data packet to be forwarded toward the first VPN site implemented using the VR-based VPN.

17. The method of claim 16, further comprising:

transmitting the data packet to the first VPN site implemented using the VR-based VPN.

18. The method of claim 12, further comprising the step of:

translating quality of service information for packets transmitted between the first VPN site implemented using the VR-based VPN and the second VPN site implemented using the VRF-based VPN.

19. The method of claim 12, further comprising the step of:

transmitting the first correlated routing information to a network device configured to handle data traffic on the VPN tunnel between the first VPN site implementing the VR-based VPN and the second VPN site implementing the VRF-based VPN.

20. A Virtual Router-Virtual Routing and Forwarding (VR-VRF) network device, comprising a first protocol connection for interfacing with a first Virtual Private Network (VPN) tunnel instantiated according to a Virtual Router (VR)-based VPN model the first protocol connection being associated with a first VPN;

a second protocol connection for interfacing with a second VPN tunnel instantiated according to a Virtual Routing and Forwarding (VRF)-based VPN mode the second protocol connection being associated with the first VPN;

a routing table for the first VPN configured to correlate routing information from the first VPN tunnel with routing information from the second VPN tunnel.

21. The network device of claim 20, wherein the routing table contains entries, each entry comprising a first tunnel VPN ID, a first tunnel route information, a second tunnel VPN ID, and a second tunnel route information.

22. The network device of claim 21, wherein the routing table contains a virtual router VPN identifier, a virtual router route information, a VRF VPN identifier, and a Border Gateway Protocol (BGP) next hop and MultiProtocol Label Switching (MPLS) VPN label.

23. A method of exchanging routing information between Virtual Private Network (VPN) sites, the method comprising the steps of:

receiving, by a network device, first routing information from a first VPN site, the first VPN site being a Virtual Router (VR)-based VPN site implemented using a VR-based VPN model, the first routing information being associated with a first VPN;

receiving, by the network device, second routing information from a second VPN site different than the first VPN site, the second VPN site being a Virtual-Routing and Forwarding (VRF)-based VPN site implemented using a VRF-based VPN model, the second routing information also being associated with the first VPN; and storing the first routing information and the second routing information together in a common routing table for the first VPN to enable the first VPN site and second VPN site to communicate with each other over the first VPN.

* * * * *